(12) United States Patent
Takasaki et al.

(10) Patent No.: US 6,658,717 B2
(45) Date of Patent: Dec. 9, 2003

(54) DUPLEX PIPE END WORKING METHOD (75) Inventors: Hiromi Takasaki, Tokyo (JP); Yoshikazu Takamatsu, Tokyo (JP); Nobuo Ichimura, Tokyo (JP); Susumu Sato, Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 54 days.

(21) Appl. No.: 09/816,345

(22) Filed: Mar. 26, 2001

(65) Prior Publication Data
US 2001/0050481 A1 Dec. 13, 2001

(30) Foreign Application Priority Data

Mar. 31, 2000 (JP) ..................................... P. 2000-096498
Feb. 9, 2001 (JP) ..................................... P. 2001-034036

(51) Int. Cl.[7] ................................................. B23P 13/04
(52) U.S. Cl. .............................................. 29/557; 83/54
(58) Field of Search .......................... 29/417, 557, 558; 83/54, 184, 187

(56) References Cited

FOREIGN PATENT DOCUMENTS

| FR | 2 367 975 A | 5/1978 | ........... F16L/21/00 |
| JP | 363150106 A * | 6/1988 | ..................... 30/97 |
| WO | WO 98/35178 | 8/1998 | ........... F16L/39/00 |

* cited by examiner

Primary Examiner—Gregory Vidovich
Assistant Examiner—Jermie E. Cozart
(74) Attorney, Agent, or Firm—Sughrue Mion, PLLC (57) ABSTRACT Firstly, using a cutting tool 30, connecting ribs 13 are cut off from the end face of a duplex pipe 10 which is held with an outer pipe 11 chucked (rib cutting step). Next, the duplex pipe 10 is cut at and from the end face of the duplex pipe 10 up to the portion thereof corresponding to the exposed length of the inner pipe 12 to thereby form a slit 21 in the outer pipe 11 and connecting ribs 13 (slit forming step) The cutting tool 30 comprises a guide hole 31 into which the inner pipe 12 can be inserted while guiding the inner pipe outer peripheral surface 12a, a cutting device 32 for cutting the connecting ribs 13, and a guide pin 33 which is disposed in the guide hole 31 and can be inserted into the inner pipe 12 while guiding the inner pipe inner peripheral surface 12b.

5 Claims, 7 Drawing Sheets

FIG. 10C

DUPLEX PIPE END WORKING METHOD

BACKGROUND OF THE INVENTION

1. Field of the Invention

The present invention relates a duplex pipe end working method and a duplex pipe end working apparatus in which an end portion of a duplex pipe comprising an outer pipe, an inner pipe and connecting ribs molded in to an integral body by extrusion working or by drawing working is skinned, more specifically, the outer pipe and connecting ribs of the duplex pipe are respectively cut in such a manner that the inner pipe can be projected outwardly of the outer pipe and can be thereby exposed to the outside.

2. Description of the Related Art

As conventionally known, a duplex pipe comprises an outer pipe through which a first fluid flows and an inner pipe disposed inside the outer pipe, through which a second fluid flows. According to the manufacturing method thereof, the duplex pipe can be roughly classified into two types. That is, one of them is a duplex pipe of a type that an outer pipe and an inner pipe are manufactured individually, and the outer pipe is drawing worked with the inner pipe inserted into the outer pipe, whereby projections provided on the inner wall of the outer pipe are pressure contacted with the outer wall of the inner pipe; and, the other is a duplex pipe of a type that an outer pipe, an inner pipe and connecting ribs for connecting together the inner and outer pipes are molded into an integral body by extrusion working or by drawing working. In recent years, from the viewpoint of reduction in the manufacturing cost thereof, there has been widely used the duplex pipe of the latter type that the outer pipe, inner pipe and connecting ribs are molded into an integral body.

In the case of the duplex pipe, a joint of a flange type or a nut-union type is connected to the end portion thereof before it is actually used. Thus, in the case of the duplex pipe of the latter type, for connection of such joint, a duplex pipe end working operation is performed on the end portion of the duplex pipe, that is, the end portions of the outer pipe and connecting ribs are respectively cut in such a manner that the inner pipe can be projected outwardly of the outer pipe.

Figure 10A:
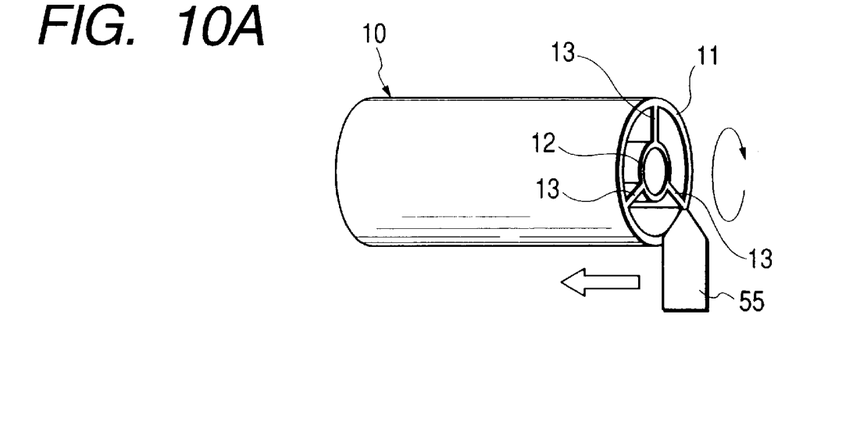
FIGS. 10A and 10C are respectively views of a conventional duplex pipe end working method.
Figure 10B:
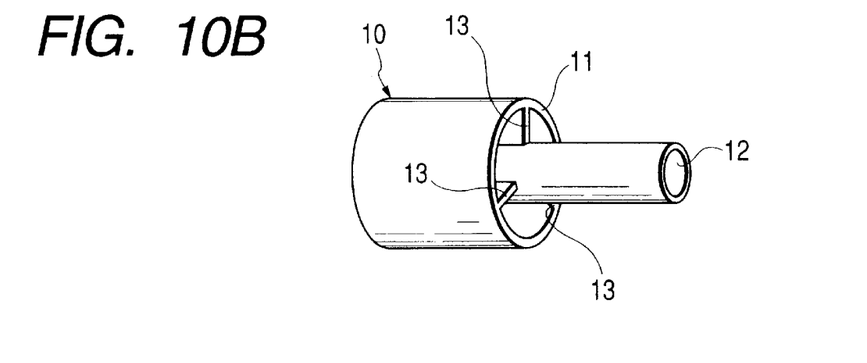
Figure 10C:
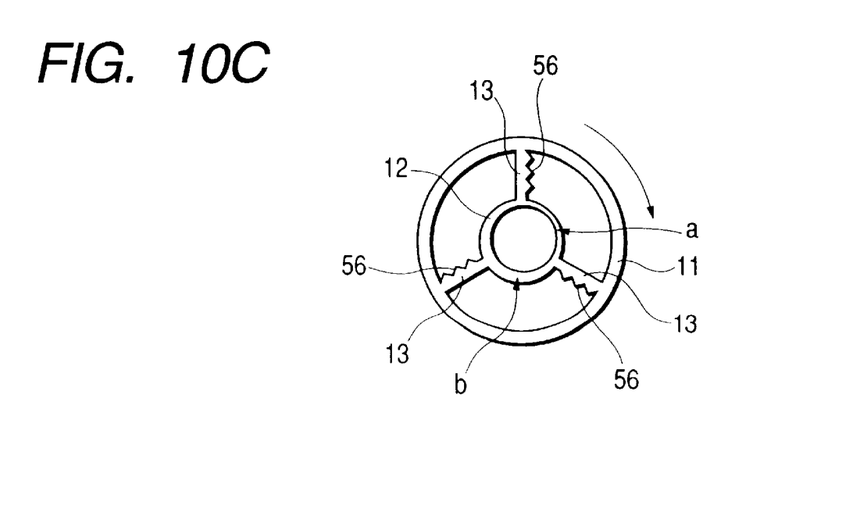

Now, FIGS. 10A to 10C are respectively views of a conventional duplex pipe, showing how the end portion of the duplex pipe is worked. As shown in FIG. 10A, a duplex pipe 10, which is held by chucking an outer pipe 11, is rotated and, while moving a cutting tool 55 in the axial direction of the duplex pipe 10 (in FIG. 10A, in the direction of an outline arrow mark) from the end face of the duplex pipe 10, the outer pipe 11 and connecting ribs 13 are cut. In case where the cutting tool 55 is moved up to a position corresponding to the exposed length of the inner pipe 12, as shown in FIG. 10B, the outer pipe 11 and connecting ribs 13 are cut so that the inner pipe 12 can be projected outwardly of the outer pipe 11 and can be thereby exposed to the outside.

By the way, in the case of the duplex pipe 10 in which the outer pipe 11, inner pipe 12 and connecting ribs 13 are molded into an integral body, due to its manufacturing method using extrusion working or drawing working, it is difficult that the center line of the outer pipe 11 is made to coincide with the center line of the inner pipe 12.

As in the above-mentioned conventional duplex pipe end working method, in case where, while chucking the outer pipe 11 and rotating the duplex pipe 10, the outer pipe 11 and connecting ribs 13 are cut according to an ordinary pipe working method using the cutting tool 55, as shown in FIG. 10C, there are produced an excessively worked portion a and an unworked portion b and, therefore, it is difficult to work the inner pipe 12 in such a manner that the thickness thereof can be made uniform over the whole periphery thereof. The reason for this is that, in case where the duplex pipe 10 is worked with the outer pipe 11 chucked, the outer and inner pipes 11 and 12 are not positioned on the same concentric axis; and, therefore, even in case where the cutting tool 55 is moved with the outer pipe 11 as a reference, the positional relation of the inner pipe 12 and cutting tool 55 cannot be made constant. Also, since an amount or a direction in which the center line of the inner pipe 12 is displaced from the center line of the outer pipe 11 is not constant, it is impossible to bring the inner pipe 12 to an on-center position while chucking the outer pipe 11.

In case where the thickness of the exposed inner pipe 12 is not uniform, when the inner pipe 12 is punched or rolled, a crack occurs in the inner pipe 12. For this reason, according to the conventional working method, in fact, it is impossible to execute a punching operation on the exposed inner pipe end portion after the duplex pipe end portion is worked.

Further, as enlargedly shown in FIG. 10C, burrs 56 occur in the end portions of the connecting ribs 13. While the burrs 56 remain unremoved, the flow resistance of the fluid flowing through the outer pipe 11 is increased and thus the flowing noise of the fluid when it flows through the outer pipe 11 is also increased. Therefore, after completion of the cutting operation by the cutting tool 55, it is necessary to execute a post-treatment operation for removing the burrs 56. Also, because there are present many portions from which the burrs 56 must be removed, it is difficult to control the cleaning of the cut powders. In case where the cleaning of the cut powders is insufficient, the connecting ribs 13 can be contaminated, which results in the poor sealing.

Moreover, since the outer pipe 11 and connecting ribs 13 are respectively cut away in their end portions by the amounts that correspond to the exposed portion of the inner pipe 12, the cutting margins of the outer pipe 11 and connecting ribs 13 are large, which gives rise to production of a large amount of cut powders. Due to this, the above-mentioned cleaning control of the cut powders is made more troublesome and difficult.

SUMMARY OF THE INVENTION

An object of the invention is to eliminate the above-mentioned drawbacks found in the conventional duplex pipe end portion working method. Accordingly, it is also an object of the invention to provide a duplex pipe end working method and a duplex pipe end working apparatus which can be applied to an operation to skin or cut the end portion of a duplex pipe comprising an outer pipe, an inner pipe and connecting ribs molded together as an integral body by extrusion working or by drawing working, can make uniform the thickness of the inner pipe, can prevent burrs from occurring in the end portions of the connecting ribs, and can reduce the quantities of cut powders produced.

In attaining the above object, according to the invention, there are provided the following duplex pipe end working method and apparatus.

(1) According to a first aspect of the invention, there is provided a duplex pipe end working method for working the end portion of a duplex pipe comprising an outer pipe, an inner disposed inside the outer pipe, and connecting ribs respectively for connecting together the outer and inner pipes formed into an integral body by extrusion working or by drawing working to skin or cut the outer pipe and connecting ribs in such a manner that the inner pipe can be projected outwardly of the outer pipe and can be thereby exposed to the outside, the duplex pipe end working method comprising: a rib cutting step of cutting the connecting ribs along the axial direction of the duplex pipe at and from the end face of the duplex pipe, using a cutting tool including a guide hole which, while guiding the outer peripheral surface of the inner pipe that is held by chucking the outer pipe, allows the inner pipe to be inserted thereinto, and a cutting device for cutting the connecting ribs; and, a slit forming step of cutting the duplex pipe at and from the end face of the duplex pipe up to the portion thereof corresponding to the exposed length of the inner pipe to thereby form a slit in the outer pipe and connecting ribs.

(2) According to a second aspect of the invention, there is provided a duplex pipe end working method for working the end portion of a duplex pipe comprising an outer pipe, an inner pipe disposed inside the outer pipe, and connecting ribs respectively for connecting together the outer and inner pipes formed into an integral body by extrusion working or by drawing working to skin or cut the outer pipe and connecting ribs in such a manner that the inner pipe can be projected outwardly of the outer pipe and can be thereby exposed to the outside, the duplex pipe end working method comprising: a slit forming step of cutting the duplex pipe at and from the end face of the duplex pipe up to the portion thereof corresponding to the exposed length of the inner pipe to thereby form a slit in the outer pipe and connecting ribs; and, a rib cutting step of cutting the connecting ribs along the axial direction of the duplex pipe at and from the end face of the duplex pipe, using a cutting tool including a guide hole which, while guiding the outer peripheral surface of the inner pipe that is held by chucking the outer pipe, allows the inner pipe to be inserted thereinto, and a cutting device for cutting the connecting ribs.

(3) According to a third aspect of the invention, in a duplex pipe end working method as set forth in the first (1) or second (2) aspect, while rotating the cutting tool, the cutting tool is moved in the axial direction of the duplex pipe to thereby cut the connecting ribs.

(4) According to a fourth aspect of the invention, in a duplex pipe end working method as set forth in the first (1) or second (2) aspect, the cutting tool is pressed in the axial direction of the duplex pipe to thereby cut the connecting ribs.

(5) According to a fifth aspect of the invention, in a duplex pipe end working method as set forth in any one of the first (1) to fourth (4) aspects, the cutting tool is structured such that a guide pin, which, while guiding the inner peripheral surface of the inner pipe, allows the inner pipe to be inserted thereinto, is disposed in the guide hole.

(6) According to a sixth aspect of the invention, there is provided a duplex pipe end working apparatus for working the end portion of a duplex pipe comprising an outer pipe, an inner pipe disposed inside the outer pipe, and connecting ribs respectively for connecting together the outer and inner pipes formed into an integral body by extrusion working or by drawing working to skin or cut the outer pipe and connecting ribs in such a manner that the inner pipe can be projected outwardly of the outer pipe and can be thereby exposed to the outside, the duplex pipe end working apparatus comprising: a cutting tool including a guide hole which, while guiding the outer peripheral surface of the inner pipe that is held by chucking the outer pipe, allows the inner pipe to be inserted thereinto, and a cutting device for cutting the connecting ribs, the cutting tool being capable of cutting the connecting ribs along the axial direction of the duplex pipe at and from the end face of the duplex pipe.

(7) According to a seventh aspect of the invention, in a duplex pipe end working apparatus as set forth in the sixth aspect (6) of the invention, the cutting tool can be rotated and can be moved along the axial direction of the duplex pipe.

(8) According to an eighth aspect of the invention, in a duplex pipe end working apparatus as set forth in the sixth aspect (6) of the invention, the cutting tool can be pressed along the axial direction of the duplex pipe.

(9) According to a ninth aspect of the invention, in a duplex pipe end working apparatus as set forth in the sixth aspect (6) of the invention, the cutting tool is structured such that the cutting device can be replaced.

(10) According to a tenth aspect of the invention, in a duplex pipe end working apparatus as set forth in any one of the sixth (6) to ninth (9) aspects of the invention, the cutting tool is structured such that a guide pin which, while guiding the inner peripheral surface of the inner pipe, allows the inner pipe to be inserted thereinto is disposed in the guide hole.

DETAILED DESCRIPTION OF THE PRESENT INVENTION

Embodiments of the invention will be described below with reference to the accompanying drawings.

First Embodiment

Figure 1:
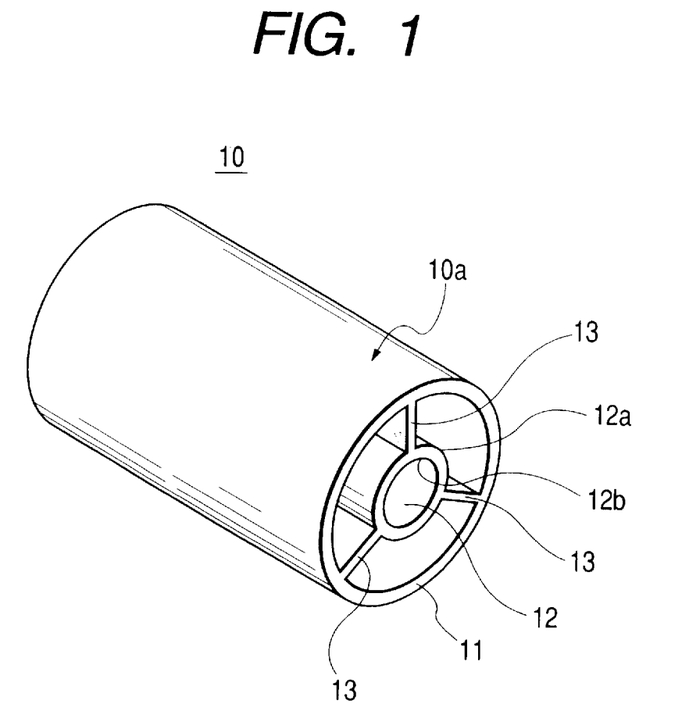
FIG. 1 is a perspective view of the end portion of a duplex pipe.
Figure 3A:
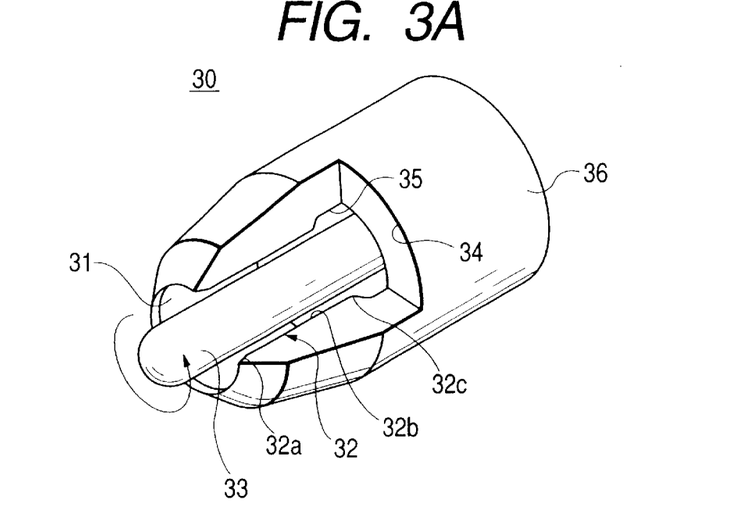
FIGS. 3A and 3B are respectively perspective and sectional views of the main portions of a cutting tool used in the first embodiment.
Figure 3B:
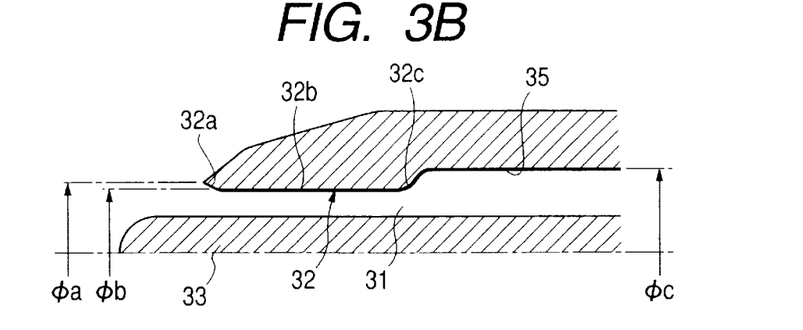
Figure 4:
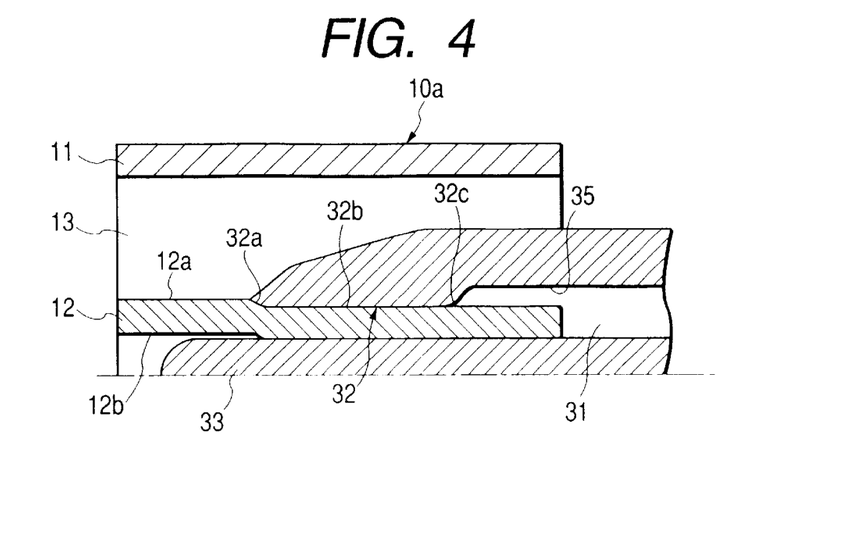
FIG. 4 is an enlarged conceptual view of a cutting operation to be executed by the above cutting tool, showing how the duplex pipe end portion is cut using the cutting tool.

FIG. 1 is a perspective view of the end portion of a duplex pipe; FIGS. 2A to 2D are respectively conceptual views of a duplex pipe end working method according to a first embodiment of the invention and a working procedure to be executed by a duplex pipe end working apparatus which can enforce the present duplex pipe end working method; FIGS. 3A and 3B are respectively perspective and sectional views of the main portions of a cutting tool used in the present embodiment; and, FIG. 4 is an enlarged conceptual view of a cutting operation to be executed by the cutting tool, showing how the duplex pipe end portion is cut using the cutting tool.

As shown in FIG. 1, a duplex pipe 10 to be used as a work is formed in such a manner that an outer pipe 11, an inner pipe 12 and connecting ribs 13 for connecting together the outer and inner pipes 11 and 12 are molded of aluminum material by extrusion working or by drawing working into an integrated body. In case where the duplex pipe 10 is used a refrigerant pipe in the cooling cycle of an air conditioner for a car, the outside diameter of the outer pipe 11 is of the order of $\phi$16–25 mm and the outside diameter of the inner pipe 12 is of the order of $\phi$6–12 mm. The connecting ribs 13 are disposed in such a manner that they divide a space, which is formed between the outer and inner pipes 11 and 12, into three sections. Since three connecting ribs 13 are disposed, they can balance well respect to three-axis bending, which can increase the freedom of a bending design. Also, the three connecting ribs 13 can provide good balance when the duplex pipe 10 is worked by extrusion.

Now, description will be given below of the procedure for working the end portion 10a of the duplex pipe 10, that is, skinning or cutting the outer pipe 11 and connecting ribs 13 in such a manner that the inner pipe 12 can be projected outwardly of the outer pipe 11 and can be thereby exposed to the outside, with reference to FIGS. 2A to 2D.

Figure 2A:
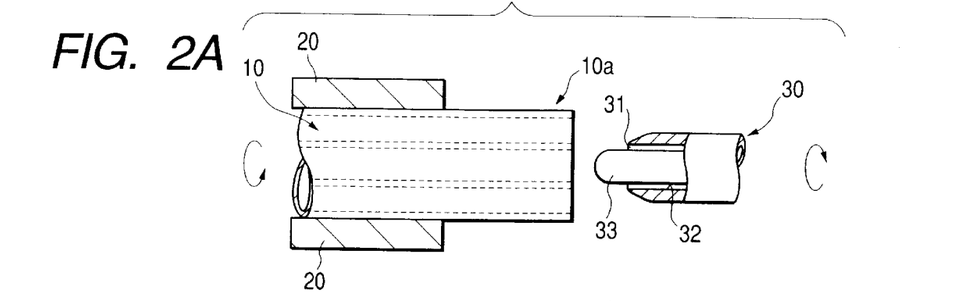
FIGS. 2A to 2D are respectively conceptual views of a duplex pipe end working method according to a first embodiment of the invention and a working procedure to be executed by a duplex pipe end working apparatus which can enforce the present duplex pipe end working method.
Figure 2B:
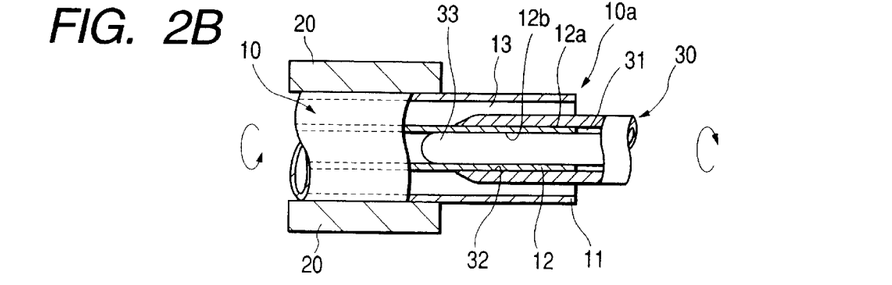

Firstly, as shown in FIG. 2A, the outer pipe 11 is chucked by a clamp 20 to thereby hold the duplex pipe 10 and, as shown in FIGS. 2A and 2B, the connecting ribs 13 are respectively cut along the axial direction of the duplex pipe 10 from the end face of the duplex pipe 10, that is, a rib cutting operation is executed (a rib cutting step). From the view point of reducing the cutting margins of the connecting ribs 13, preferably, the rib cutting operation may be executed only on the base end portions of the connecting ribs 13, that is, only on the portions of the connecting ribs 13 that are connected to the outer peripheral surface 12a of the inner pipe 12.

In the rib cutting operation, there is used a cutting tool 30. And, the cutting tool 30 comprises a guide hole 31 into which the inner pipe 12 can be inserted while guiding the outer peripheral surface 12a of the inner pipe 12, and a cutting device 32 which is used to cut the connecting ribs 13. Also, the cutting tool 30 further includes a guide pin 33 which is disposed within the guide hole 31 and can be inserted into the inner pipe 12 while guiding the inner peripheral surface 12b of the inner pipe 12. The inside diameter of the guide hole 31 is almost equal to or slightly smaller than the outside diameter of the inner pipe 12, while the outside diameter of the guide pin 33 is almost equal to or slightly smaller than the inside diameter of the inner pipe 12.

The cutting tool 30 is disposed in such a manner that it can be rotated as well as can be moved in the axial direction of the duplex pipe 10. In operation, while rotating the duplex pipe 10 and cutting tool 30, the cutting tool 30 is moved in the axial direction of the duplex pipe 10 to thereby cut the connecting ribs 13. The cutting operation of the connecting ribs 13 is carried out until the leading end of the cutting device 32 reaches the positions of the connecting ribs 13 that correspond to the exposed length of the inner pipe 12. In case where cutting of the connecting ribs 13 by a given dimension is completed, the cutting tool 30 is pulled out from the duplex pipe 10. On the right side (in FIGS. 2A to 2D) of the position where the leading end of the cutting device 32 has reached, there is formed a clearance 13a (see FIG. 2C) between the outer peripheral surface 12a of the inner pipe 12 and the cut surfaces of the connecting ribs 13. By the way, in the rib cutting operation, the duplex pipe 10 may not be rotated.

Figure 2C:
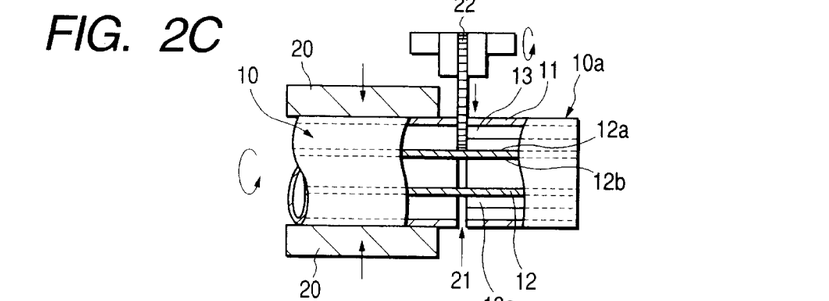

Next, as shown in FIG. 2C, the portion of the duplex pipe 10 which extends from the end face of the duplex pipe 10 to the position where the leading end of the cutting device 32 of the cutting tool 30 has reached, that is, the portion of the duplex pipe 10 which corresponds to the exposed length of the inner pipe 12 is cut or slitted to thereby form a slit 21 in the outer pipe 11 and connecting ribs 13 (slit forming step)

In the slit forming operation, there is used a metal saw 22. In operation, while rotating the duplex pipe 10 and metal saw 22, the metal saw 22 is moved in the direction of an arrow mark shown in FIG. 2C to thereby form the slit 21. The width of the slit 21 is of the order of 1 mm. The slit 21 is formed such that it reaches the clearance 13a.

Figure 2D:
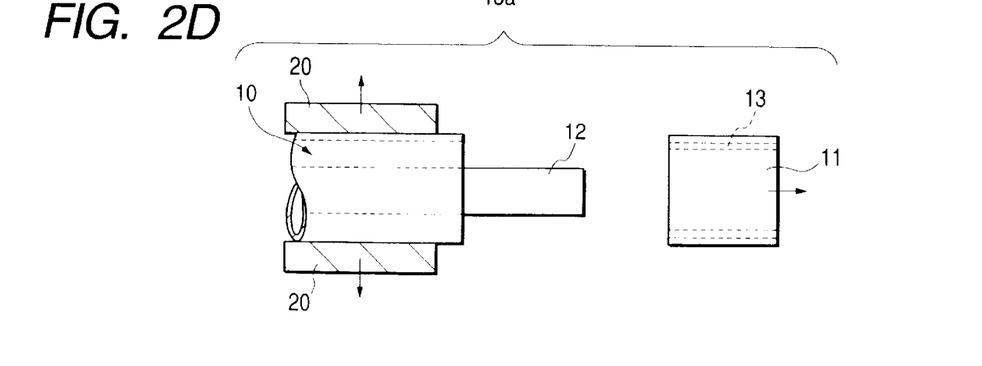

Due to formation of the slit 21, on the leading end side (in FIG. 2C, on the right side) of the duplex pipe 10 that is located forwardly of the slit 21, the connection between the outer and inner pipes 11 and 12 is cut. Therefore, as shown in FIG. 2D, in case where the leading end side portion of the duplex pipe 10 located forwardly of the slit 21 is pulled out, the inner pipe 12 is projected outwardly of the outer pipe 11 and is thereby exposed to the outside. This completes the duplex pipe end working operation.

Referring now to FIGS. 3A and 3B, the cutting tool 30 comprises a cylindrical-shaped holder 36 in which the guide hole 31 is formed. The holder 36 is structured such that the leading end thereof has a substantially frustum-shaped section and a portion of the holder 36 in the peripheral direction thereof is cut away to thereby form an opening 34 communicating with the guide hole 31. The cutting device 32, which is used to cut the connecting ribs 13, is disposed in one inside edge of the opening 34. Also, the leading end portion of the guide pin 33 is formed in a hemi-spherical shape and is projected outwardly of the leading end of the cutting device 32. The guide pin 33 is disposed such that it is connected to the holder 36 while the axis thereof is coincident with the axis of the holder 36. Also, the guide pin 33 can be rotated together with the holder 36. The axes of the guide pin 33 and holder 36 provide the axis of the cutting tool 30.

In operation, the cutting tool 30 is moved forward toward the duplex pipe 10 with the axis thereof coincident with the axis of the outer pipe 11. The end portion 10a of the duplex pipe 10 is projected outwardly of the portion of the duplex pipe 10 that is chucked by the clamp 20 and, therefore, the end portion 10a is flexible to a certain degree. Thus, even in case where the center of the inner pipe 12 is slightly displaced from the center of the outer pipe 11, the guide pin 33 can be inserted into the inner pipe 12 smoothly. As the guide pin 33 is inserted, the axis of the inner pipe 12 is allowed to coincide with the axis of the cutting tool 30, thereby being able to correct the above-mentioned displacement of the inner pipe 12. Also, insertion of the guide pin 33 can prevent the axis of the cutting tool 30 from swinging or oscillating.

In case where the cutting tool 30 is moved further forward after the guide pin 33 is inserted into the inner pipe 12, the inner pipe 12 is inserted into the guide hole 31, while the outer peripheral surface 12a thereof being guided by the inner peripheral surface of the of the guide hole 31. Such insertion of the inner pipe 12 into the guide hole 31 can also correct the above-mentioned displacement of the inner pipe 12.

As shown in FIG. 3B, the leading end portion 32a and trailing end portion 32c of the cutting device 32 are respectively so formed as to have an R-shaped section: and, the diameter of the main body portion 32b of the cutting device 32 is set as φb, whereas the diameter of the leading end portion 32a is set as φa (φa >φb). The reason for this is that, as shown in FIG. 4, after the connecting ribs 13 are cut using the cutting device leading end portion 32a, the inner pipe 12 is swaged to thereby enhance the surface precision of the inner pipe outer peripheral surface 12a. The clearance dimension between the cutting device main body portion 32b and guide pin 33 is set as a dimension which is suitable for swaging of the inner pipe 12. Such setting of the clearance dimension can decide the thickness of the inner pipe 12 after the connecting ribs 13 are cut, so that, while the inner pipe 12 is being swaged, the thickness thereof can be made uniform over the entire periphery thereof.

Further, as shown in FIG. 3B, on the trailing end side of the cutting device 32, there is formed a so called relief 35, while the diameter of the relief 35 is set as φc (φc>φb). The reason for this is to reduce the working resistance of the cutting device 32 to thereby extend the life of the cutting device 32.

According to the first embodiment, due to formation of the slit, burrs are hard to occur in the end portions of the connecting ribs 13. The restricted occurrence of the burrs can prevent an increase in the flow resistance of the first fluid flowing through the outer pipe 11, thereby being able to prevent the flowing noise of the first fluid when it flows through the outer pipe 11 from being louder. Also, there is eliminated a post-treatment operation for removing burrs, which makes it possible to simplify the duplex pipe end working operation. Even if a post-treatment operation was necessary, burrs occurring in the embodiment are for smaller in number than in the prior art and, therefore, the post-treatment operation is much easier. This can facilitate the cleaning control of the cut powders involved with the burr removing operation and thus can prevent poor sealing due to contamination.

Also, according to the embodiment, after the guide pin 33 of the cutting tool 30 is inserted into the inner pipe 12 and the displacement of the inner pipe 12 is corrected such that the axis thereof can be matched to the axis of the cutting tool 30, the connecting ribs 13 are cut respectively. Therefore, while keeping the thickness of the inner surface 12 uniform over the entire periphery thereof, the connecting ribs 13 can be cut respectively in the axial direction of the duplex pipe 10. Also, since the inner pipe 12 can be held in a centered state by the guide pin 33 inserted therein, not only when the connecting ribs 13 are cut, but also when the outer peripheral surface 12a of the inner pipe 12 is cut in part, the thickness of the inner pipe 12 can be kept uniform over the entire periphery thereof.

Further, when the duplex pipe 10 is manufactured by extrusion working, the hole formed on the inner peripheral surface 12b side of the inner pipe 12 provides sufficiently high roundness due to the characteristic of the manufacturing method thereof. Thus, by inserting the guide pin 33 into the high-roundness hole of the inner pipe 12 to thereby guide the inner pipe inner peripheral surface 12b, the precision with which the displacement of the inner pipe 12 is corrected can be enhanced. In this respect as well, the thickness of the inner pipe 12 can be made further uniform.

Since the thickness of the inner pipe 12 can be restricted according to the clearance dimension between the cutting device main body portion 32b and guide pin 33, use of the guide pin 33 is especially effective when the inner pipe 12 is swaged and when the inner pipe 12 varies in thickness at the stage when the duplex pipe 10 is manufactured.

In some cases, in the exposed end portion of the inner pipe 12, there is formed a seal groove for mounting an O ring. In this case, as described before, since the thickness of the exposed end portion of the inner pipe 12 is uniform, such seal groove can be formed by punching or by rolling without giving rise to a crack therein. And, the dimensional precision of the seal groove can be maintained with ease. Also, in some cases, the end portion of the inner pipe 12 is brazed. In this case, since the thickness of the inner pipe end portion is uniform and the hole of the inner pipe 12 provides sufficient roundness, poor brazing is hard to occur.

Further, because at least the outer pipe 11 is uncut and is left as it is, the cutting margin of the duplex pipe 10 can be minimized to thereby reduce the quantities of cut powders produced, the cleaning control of the cut powders can be facilitated, and poor sealing possibly caused by contamination can be prevented positively.

Second Embodiment

FIGS. 5A to 5D are respectively conceptual views of a duplex pipe end working method according to a second embodiment of the invention as well as a working procedure to be executed by a duplex pipe end working apparatus which can enforce the present duplex pipe end working method.

The second embodiment is different from the first embodiment, in which the slit forming step is enforced after completion of the rib cutting step, in that a rib cutting step is enforced after completion of a slit forming step.

Figure 5A:
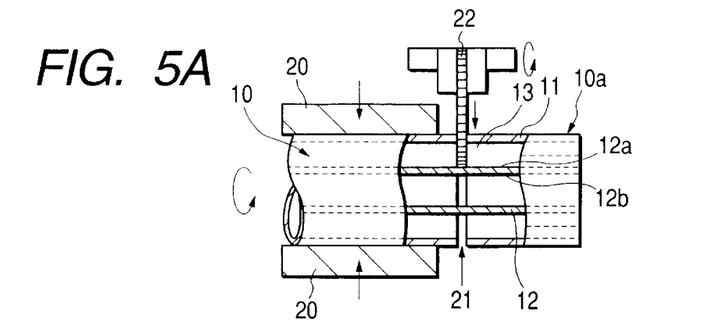
FIGS. 5A to 5D are respectively conceptual views of a duplex pipe end working method according to a second embodiment of the invention as well as a working procedure to be executed by a duplex pipe end working apparatus which can enforce the present duplex pipe end working method.

In the second embodiment, firstly, as shown in FIG. 5A, an outer pipe 11 is chucked by a clamp 20 to thereby hold a duplex pipe 10, and the duplex pipe 10 is slitted; that is at and from the end face of the duplex pipe 10 up to the portion of the duplex pipe 10 that corresponds to the exposed length of the inner pipe 12, there is formed a slit 21 in the duplex pipe 10, specifically, in the outer pipe 12 and connecting ribs 13 (slit forming step).

In the slit forming operation, similarly to the first embodiment, there is used a metal saw 22. While rotating the duplex pipe 10 and metal saw 22, the metal saw 22 is moved forward in the direction of an arrow mark shown in FIG. 5A to thereby form a slit 21. The width of the slit 21 is of the order of 1 mm. The slit 21 is formed on until it reaches the outer peripheral surface of the inner pipe 12. However, while taking it into consideration that the center of the inner pipe 12 is slightly displaced from the center of the outer pipe 11, preferably, the slit 21 may be formed in such a manner that the connecting ribs 13 can be respectively left in part by a slight dimension (for example, of the order of 0.1 mm).

Figure 5B:
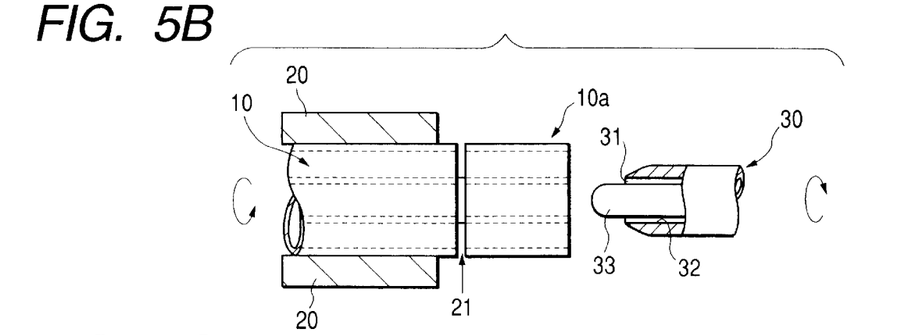
Figure 5C:
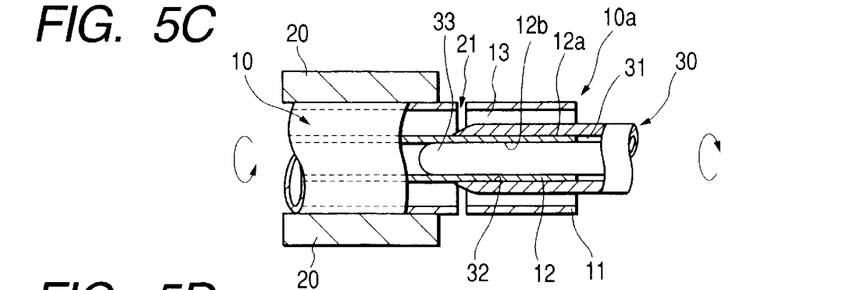
Figure 5D:
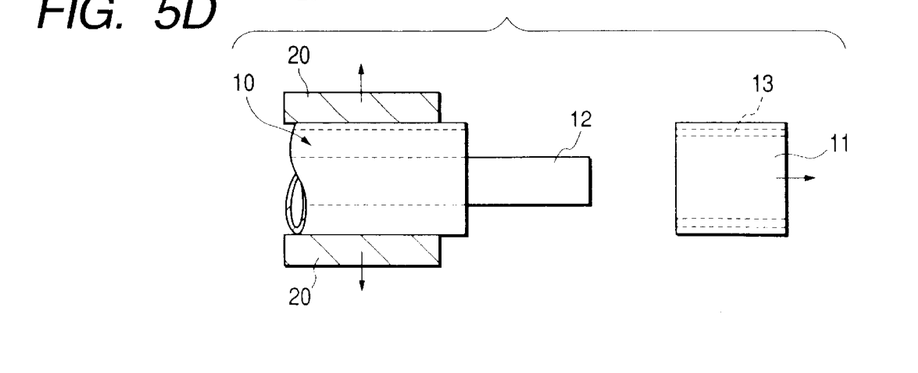

Next, as shown in FIGS. 5B and 5C, the connecting ribs 13 are respectively cut along the axial direction of the duplex pipe 10 starting at and from the end face of the duplex pipe 10, that is, a rib cutting operation is executed (rib cutting step). In the rib cutting operation, from the viewpoint of reduction in the cutting margins of the connecting ribs 13, preferably, only the base end portions of the connecting ribs 13, that is, only the portions of the connecting ribs 13 that are connected to the outer peripheral surface 12a of the inner pipe 12 may be cut.

In the rib cutting operation, similarly to the first embodiment, there is used a cutting tool 30. In operation, while rotating the duplex pipe 10 and cutting tool 30, the cutting tool 30 is moved along the axial direction of the duplex pipe 10 to thereby cut the connecting ribs 13. Such cutting of the connecting ribs 13 is executed on until the leading end of the cutting tool 30 reaches the slit 21. By the way, in the rib cutting operation, alternatively, the duplex pipe 10 may not be rotated.

With such cutting of the connecting ribs 13, on the leading end side (in FIG. 5C, on the right side) of the duplex pipe 10 that is located forwardly of the slit 21, the connection between the outer and inner pipes 11 and 12 is cut. Therefore, shown in FIG. 5D, in case where the leading end side portion of the duplex pipe 10 located forwardly of the slit 21 is pulled out, the inner pipe 12 is projected outwardly of the outer pipe 11 and is thereby exposed to the outside. This completes the duplex pipe end working operation.

The cutting tool 30 used in the second embodiment is the same as shown in the first embodiment and thus the description thereof is omitted here.

In operation, the cutting tool 30 is moved forward toward the duplex pipe 10 with the axis thereof coincident with the axis of the outer pipe 11. The end portion 10a of the duplex pipe 10, in which the slit 21 is formed, is connected only by the inner pipe 12 and, therefore, the end portion 10a is flexible to a certain degree. Thus, even in case where the center of the inner pipe 12 is slightly displaced from the center of the outer pipe 11, the guide pin 33 can be inserted into the inner pipe 12 smoothly, so that the above-mentioned displacement of the inner pipe 12 can be corrected. Also, the smooth insertion of the guide pin 33 can prevent the axis of the cutting tool 30 from swinging or oscillating.

In case where the cutting tool 30 is moved further forward after the guide pin 33 is inserted into the inner pipe 12, the inner pipe 12 is inserted into the guide hole 31, while the outer peripheral surface 12a thereof is being guided by the inner peripheral surface of the of the guide hole 31. Such insertion of the inner pipe 12 into the guide hole 31 can also correct the above-mentioned displacement of the inner pipe 12.

According to the second embodiment, in addition to various operation effects which have been already discussed in the first embodiment, there can be further obtained the following operation effects in lining with the fact that the slit forming operation is executed before the rib cutting operation.

That is, in the first embodiment, the end portion 10a of the duplex pipe 10 in the rib cutting operation remains connected by the outer pipe 11, connecting ribs 13 and inner pipe 12; but, on the other hand, in the second embodiment, the end portion 10a of the duplex pipe 10 in the rib cutting operation is connected only the inner pipe 12. Therefore, according to the working procedure of the second embodiment, when compared with the working procedure of the first embodiment, the flexibility of the end portion 10a is increased, which can further facilitate the insertion of the guide pin 33 into the inner pipe 12. Accordingly, the displacement of the inner pipe 12 can be corrected more easily as well as the centering of the inner pipe 12 can be attained more easily.

Also, in the rib cutting operation, the forward moving position of the cutting tool 30 can be visually confirmed through the slit 21. This can prevent the cutting tool 30 from cutting the connecting ribs 13 excessively in the axial direction of the duplex pipe 10.

Further, since the slit forming operation is carried out before the rib cutting operation, in the slit forming operation, in the respective connecting ribs 13, there are not present any cut surface extending along the axial direction thereof, which can eliminate a fear that the outer peripheral surface of the inner pipe 12 can be damaged by such cut surface.

Third Embodiment

Figure 6A:
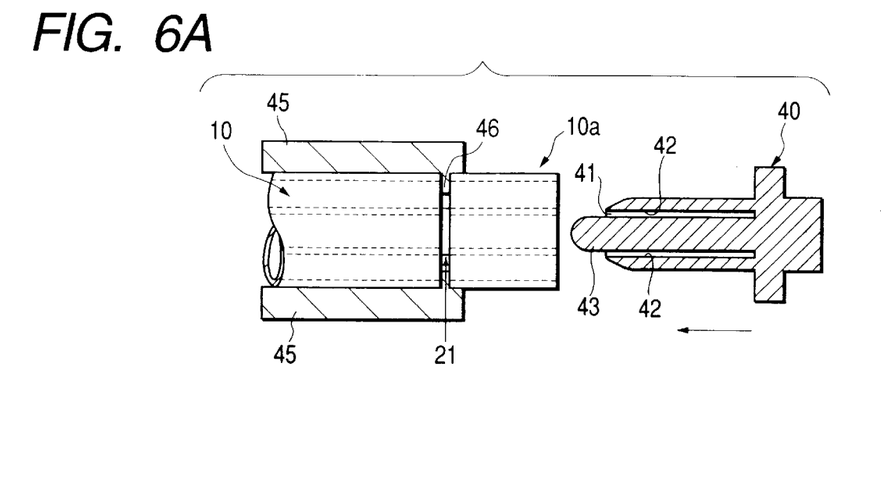
FIGS. 6A and 6B respectively show the concept of a third embodiment according to the invention; that is, they are conceptual views of a working procedure for cutting connecting ribs 13 according to the third embodiment of the invention.
Figure 6B:
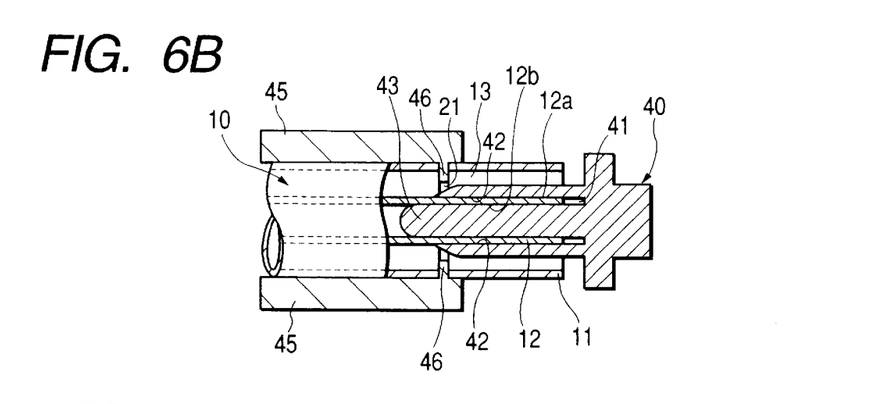

Now, FIGS. 6A and 6B respectively show the concept of a third embodiment according to the invention; that is, they are conceptual views of a working procedure for cutting connecting ribs 13 according to the third embodiment of the invention.

The third embodiment is similar to the second embodiment in that a rib cutting step is carried out after a slit forming step but the third embodiment is different from the second embodiment in the rib cutting method and cutting tool.

A cutting tool 40 employed in the third embodiment, similarly to the previously described cutting tool 30, comprises a guide hole 41 into which an inner pipe 12 can be inserted while guiding the outer peripheral surface 12a of the inner pipe 12, a cutting device 42 for cutting connecting ribs 13, and a guide pin 43 which is disposed in the guide hole 41 and also can be inserted into the inner pipe 12 while guiding the inner peripheral surface 12b of the inner pipe 12.

However, the cutting tool 40 is disposed in such a manner that it can be pressed in the axial direction thereof; that is, in operation, according to a punch method, the cutting tool 40 is pressed in the axial direction of the duplex pipe to thereby cut the connecting ribs 13. In this respect, the present embodiment is different from the previously described working method and cutting tool 30 in which the connecting ribs 13 are cut according to a rotating method. In the present embodiment, due to use of the punch method, there is eliminated the opening 34 that is formed in the cutting tool 30, so that the cutting device 42 is formed such that it extends in a solid state over the entire periphery of the cutting tool 40.

By the way, although there is omitted the detailed description thereof, in the cutting tool 40 of a punch type, according to a similar concept to the cutting tool 30 of a rotation type, the shape of the cutting device 42 is set so as to be able to enhance the surface precision of the inner pipe outer peripheral surface 12a as well as the relief shape thereof is set so as to be able to reduce the working resistance.

Also, in the case of a clamp 45 which is used in the rib cutting step, it is capable of chucking even the portion of the outer pipe 11 located on the leading end side thereof beyond the slit 21, and there is further disposed a projecting ring 46 which can be inserted into the slit 21. The reason for this is that, when the cutting tool 40 is pressed, the inner pipe 12 can be prevented from buckling. By the way, the dimension for chucking the leading end side portion of the outer pipe 11 beyond the slit 21 is set in the range not interfering with the displacement correcting function with which the guide pin 43 can be inserted into the inner pipe 12 to thereby correct the displacement of the inner pipe 12.

Even in the case of the cutting tool 40 of a punch type, in order to be able to cut the connecting ribs 13 after correction of the displacement of the inner pipe 12, the thickness of the inner pipe 12 can be set uniform over the entire periphery thereof. Further, when compared with the cutting tool 30 of a rotation type, the quantities of cut powders generated can be reduced remarkably and thus the cleaning control of the cut powders can be facilitated further.

By the way, in the working procedure in which, as in the first embodiment, the slit forming step is carried out after completion of the rib cutting step, instead of the cutting tool 30 of a rotation type, there can also be used the cutting tool 40 of a punch type.

Fourth Embodiment

Figure 7:
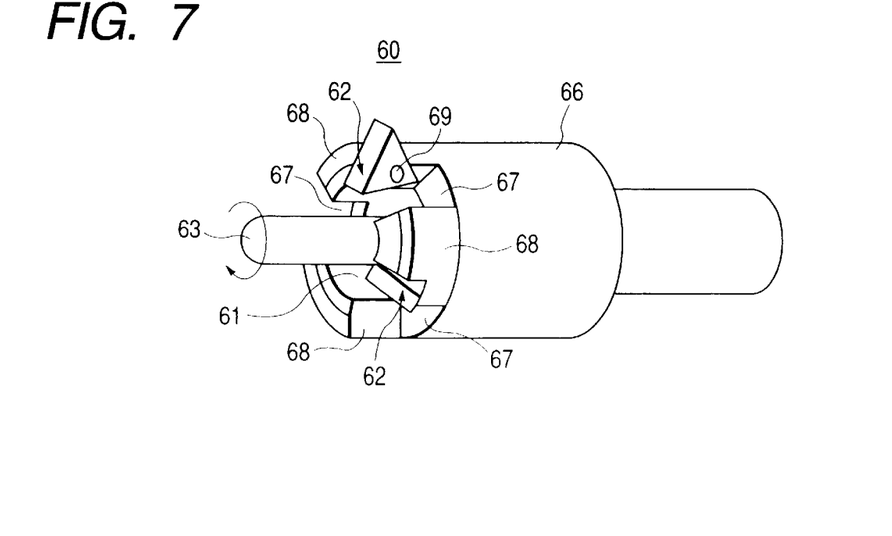
FIG. 7 is a perspective view of a cutting tool employed in a fourth embodiment of the invention.

Now, FIG. 7 is a perspective view of a cutting tool 60 which is employed in a fourth embodiment according to the invention.

The cutting tool 60 employed in the fourth embodiment, similarly to the previously described cutting tools 30 and 40, comprise a guide hole 61 into which an inner pipe 12 can be inserted while guiding the outer peripheral surface 12a of the inner pipe 12, a cutting device 62 for cutting connecting ribs 13, and a guide pin 63 which is disposed in the guide hole 61 and also can be inserted into the inner pipe 12 while guiding the inner peripheral surface 12b of the inner pipe 12.

However, the present cutting tool 60 is different from the previously described cutting tools 30 and 40 in that the cutting device thereof can be replaced. The cutting tool 60 includes a cylindrical-shaped holder 66 in which there is formed a guide hole 61. The leading end portion of the holder 66 is cut away at three positions thereof, whereby there are formed three openings 67 each communicating with the guide hole 61, and three cutting device support portions 68. To one end portion of each of the cutting device support portions 68, there is replaceably fastened the cutting device 62 by a bolt 69. The guide pin 63 is connected to the holder 66 and can be rotated together with the holder 66.

By the way, although there is omitted the detailed description thereof, in the cutting tool 60 as well, according to a similar concept to the cutting tool 30, the shape of the cutting device 62 is set so as to be able to enhance the surface precision of the inner pipe outer peripheral surface 12a as well as the relief shape thereof is set so as to be able to reduce the working resistance.

According to the thus structured cutting tool 60, in case where the cutting device 62 is worn as it cuts the connecting ribs 13, it can be replaced with a new cutting device 62, which makes it possible to use the holder 66 repeatedly; that is, the holder 66 can be used more effectively.

By the way, in the case of the cutting tool 40 of a punch type as in the third embodiment as well, it can be modified in such a manner that the cutting device 42 can be freely replaced with respect to the same holder.

Fifth Embodiment

Figure 8A:
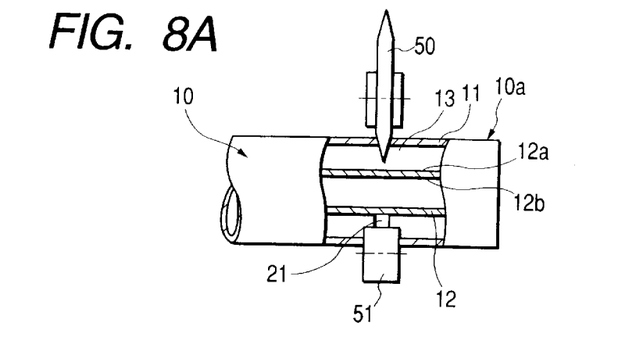
FIGS. 8A and 8B respectively show the concept of a fifth embodiment according to the invention; that is, they are conceptual views of a working procedure for forming a slit according to the fifth embodiment of the invention.
Figure 8B:
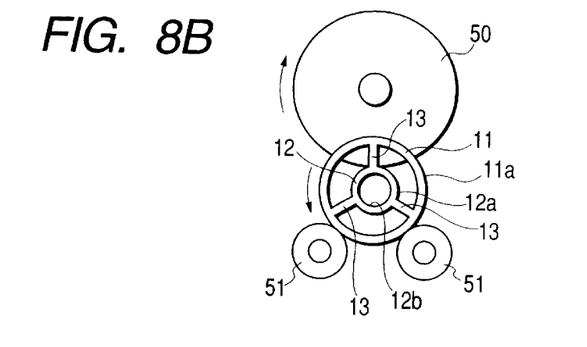

Now, FIGS. 8A and 8B respectively show the concept of a fifth embodiment according to the invention; that is, they are conceptual views of a working procedure for forming a slit 21 according to the fifth embodiment of the invention.

The slit forming operation may also be executed using not only the previously described metal saw 22 but also such a spin cutter 50 as shown in FIGS. 8A and 8B. Here, in FIGS. 8A and 8B, reference character 51 designates a rotatable receiving roller which can be contacted with the outer peripheral surface 11a of the outer pipe 11.

In the case of a slit forming operation using the spin cutter 50, when compared with the slit forming operation using the metal saw 22, the quantities of cut powders generated can be reduced remarkably, which in turn can further facilitate the cleaning control of the cut powders.

Other Modifications

In the above-mentioned embodiments of the invention, there have been illustrated the cutting tools 30, 40 and 60 in which the guide pins 33, 43 and 63 are respectively disposed in their associated guide holes 31, 41 and 61; however, the invention is not limited to them. For example, since the inner pipe 12 is inserted while guiding the inner pipe outer peripheral surface 12a by its associated one of the guide holes 31, 41 and 61 of the cutting tools 30, 40 and 60, even in case where the guide pins 33, 43 and 63 are omitted, the displacement of the inner pipe 12 can be corrected only by its associated one of the guide holes 31, 41 and 61. Omission of the guide pins 33, 43 and 63 is especially effective when the center of the inner pipe 12 is displaced from the center of the outer pipe 11 but variations in the thickness of the inner pipe 12 are within the allowable range.

Application Example to Joint

Figure 9:
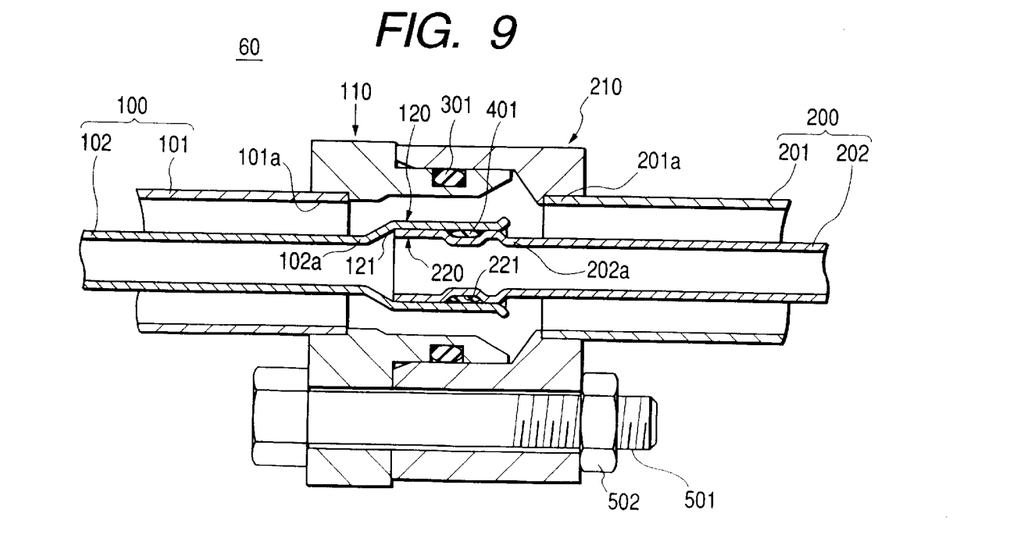
FIG. 9 is a section view of a joint for connecting together two duplex pipes the end portions of which have been worked according to the invention.

Now, FIG. 9 is a section view of a joint 60 for connecting together two duplex pipes the end portions of which have been worked according to the invention.

In FIG. 9, first and second duplex pipes 100 and 200 are respectively pipes which are used as refrigerant pipes in a cooling cycle of an air conditioner for a car, and also which respectively include outer and inner pipes 101, 102 and 201, 202; and, a low-pressure-gas refrigerant is allowed to flow through the outer pipes 101 and 201, whereas a high-pressure-gas refrigerant is allowed to flow through the inner pipes 102 and 202. The end portions of the first and second duplex pipes 100 and 200 are respectively worked according to the invention, while the inner pipes 102 and 202 are respectively projected by a given length outwardly of the outer pipes 101 and 201 and are thereby exposed to the outside.

The joint 60, which is a joint of a flange type, is structured in the following manner: that is, a first outer pipe seal member 110 is brazed to the outer pipe end portion 101a of the first duplex pipe 100; and, a second outer pipe seal member 210 is brazed to the outer pipe end portion 201a of the second duplex pipe 200. Between the first and second outer pipe seal members 110 and 210, there is interposed an O ring 301, thereby being able to prevent the leakage of the low-pressure-gas refrigerant flowing through the outer pipes 101 and 201.

In the inner pipe end portion 102a of the first duplex pipe 100, there is formed a first inner pipe seal portion 120 and, in the inner pipe end portion 202a of the second duplex pipe 200, there is formed a second inner pipe seal portion 220. Between the first and second inner pipe seal portions 120 and 220, there is interposed an O ring 401, which makes it possible to prevent the leakage of the high-pressure-gas refrigerant flowing through the inner pipes 102 and 202.

The first inner pipe seal portion 120 includes a flare portion 121 which is spread. The flare portion 121 can be formed by punching the inner pipe end portion 102a into a flare shape. On the other hand, in the second inner pipe seal portion 220, there is formed a ring groove 221 into which the O ring 401 can be mounted. The ring groove 221 can be formed by punching or rolling the inner pipe end portion 202a. The second inner pipe seal portion 220 can be fitted into the flare portion 121 of the first inner pipe seal portion 120.

The inner pipe end portions 102a and 202a, which have been worked according to the invention, are uniform in thickness. Therefore, even in case where a punching operation or a rolling operation is enforced on such inner pipe end portions 102a and 202a, there is no fear that there can occur cracks in them, and thus the flare portion 121 and ring groove 221 can be formed. Also, the dimensional precision of the flare portion 121 and ring groove 221 can also be maintained easily.

And, a through bolt 501 is inserted through the two outer pipe seal members 110 and 210 and a nut 502 is fastened to the through bolt 501, whereby the two duplex pipes 100 and 200 can be connected together.

As has been described heretofore, according to the first fifth aspects of the invention, there is provided a duplex pipe end working method which can be suitably applied to an operation to skin or cut the end portion of a duplex pipe comprising an outer pipe, an inner pipe and connecting ribs molded into an integral body by extrusion working or by drawing working. That is, with use of the present duplex pipe end working method, the thickness of the inner pipe can be made uniform, burrs can be prevented from occurring in the end portions of the connecting ribs, and production of cut powders can be reduced.

Especially, according to the second aspect of the invention, in addition to the above effects, in linking with the enforcement of the slit forming operation before the rib cutting operation, the end portion of the inner pipe is increased in flexibility, which makes it possible to correct the displacement of the inner pipe easily as well as to facilitate the centering of the inner pipe. Also, the advancing position of the cutting tool can be visually confirmed through the slit, thereby being able to prevent the cutting tool from cutting the connecting ribs excessively in the axial direction of the duplex pipe. Further, in the slit forming operation, in the connecting ribs, there exists no cut surface extending along the axial direction of the duplex pipe. This eliminates a fear that the inner pipe outer peripheral surface can be damaged by such cut surface.

Also, according to the fifth aspect of the invention, the thickness of the inner pipe can be restricted according to the clearance dimension between the cutting device and guide pin. Thanks to this, in case where the inner pipe is swaged, or even in case where the inner pipe is found to vary in thickness at the stage when the duplex pipe is manufactured, the thickness of the inner pipe can be made uniform And, according to a duplex pipe end working apparatus as set forth in the sixth to tenth aspects of the invention, in the operation to skin or cut the end portion of a duplex pipe comprising an outer pipe, an inner pipe and connecting ribs molded into an integral body by extrusion working or by drawing working, the thickness of the inner pipe can be made uniform, burrs can be prevented from occurring in the end portions of the connecting ribs, and production of cut powders can be reduced.

Especially, according to the ninth aspect of the invention, a cutting device, which is worn as it cuts the connecting ribs, can be replaced with a new cutting device; and, according to the tenth aspect of the invention, the thickness of the inner pipe can be restricted according to the clearance dimension between the cutting device and guide pin. Thanks to this, in case where the inner pipe is swaged, or in case where the inner pipe is found to vary in thickness at the stage when the duplex pipe is manufactured, the thickness of the inner pipe can be made uniform.

What is claimed is:

1. A method for working an end portion of a duplex pipe including an outer pipe, an inner pipe disposed inside the outer pipe, and a plurality of connecting ribs respectively for connecting the outer pipe and the inner pipe to cut the outer pipe and the connecting ribs to project and expose the inner pipe from the outer pipe, the method comprising:

chucking the duplex pipe;

cutting the connecting ribs from the end portion along an axial direction of the duplex pipe;

then cutting the outer pipe and the connecting ribs at a predetermined position away from said end portion to form a slit in the outer pipe and the connecting ribs; and removing the outer pipe and the connecting ribs which have been cut to expose a part of the inner pipe.

2. The method as claimed in claim 1, wherein a cutting tool including a guide hole for guiding the outer peripheral surface of the inner pipe and for allowing the inner pipe to be inserted thereinto, and a cutting device for cutting the connecting ribs, are used for cutting the connecting ribs.

3. The method as set forth in claim 2, wherein, while rotating the cutting tool, the cutting tool is moved in the axial direction to cut the connecting ribs.

4. The method as claimed in claim 2, wherein the cutting tool is pressed from the end portion of the duplex pipe in the axial direction to cut the connecting ribs.

5. The method as claimed in claim 2, wherein a guide pin is disposed in the guide hole, and allowed to be inserted into the inner pipe while guiding the inner peripheral surface of the inner pipe.

* * * * *